[11] 3,597,046

| [72] | Inventor | Harry E. Smithgall |
| | | Seneca Falls, N.Y. |
| [21] | Appl. No. | 763,153 |
| [22] | Filed | Sept. 27, 1968 |
| | | Division of Ser. No. 317,352, |
| | | Pat. No. 3,448,667. |
| [45] | Patented | Aug. 3, 1971 |
| [73] | Assignee | Sylvania Electric Products Inc. |

[54] COATED LIGHT PERMEABLE OPTICAL COMPONENT
2 Claims, 5 Drawing Figs.

[52] U.S. Cl. .................................................. 350/164,
350/311, 350/314
[51] Int. Cl. .................................................. G02b 1/10
[50] Field of Search .................................................. 95/1;
350/311, 314, 164

[56] References Cited
UNITED STATES PATENTS

| 3,149,968 | 9/1964 | Stephens | 350/314 |
| 1,469,931 | 10/1923 | Davison | 350/314 X |
| 2,356,694 | 8/1944 | Potter | 350/314 X |
| 2,655,452 | 10/1953 | Barnes | 350/311 UX |
| 2,960,015 | 11/1960 | Rodine | 350/314 X |
| 3,039,349 | 6/1962 | Rodgers | 350/311 X |

FOREIGN PATENTS

| 508,011 | 6/1939 | Great Britain | 350/311 |

*Primary Examiner*—Samuel S. Matthews
*Assistant Examiner*—Monroe H. Hayes
*Attorneys*—Cyril A. Krenzer, Norman J. O'Malley and Frederick H. Rinn ABSTRACT: A coated light permeable refractive medium for use in an optical system to discretely attenuate radiant energy beamed from a controlled light source whereof an area of metallic coating is disposed on at least one surface of the medium by photosensitive deposition. The light attenuation characteristics of the refractive optical component are formed in the photosensitive coating by the irradiation pattern of the light source in the system.

INVENTOR.
HARRY E. SMITHGALL

INVENTOR.
HARRY E. SMITHGALL

COATED LIGHT PERMEABLE OPTICAL COMPONENT

CROSS-REFERENCES TO RELATED APPLICATIONS

This application is a divisional application of Ser. No. 317,352 filed Oct. 18, 1963, now U.S. Pat. No. 3,448,667 which is assigned to the assignee of the present invention. This divisional application contains matter disclosed but not claimed in another application Ser. No. 763,214 filed concurrently herewith, which application is also a division of Ser. No. 317,352.

BACKGROUND OF THE INVENTION

This invention relates to a variable density light attenuation coating for light permeable surfaces and more particularly to a light sensitive attenuation coating and method for producing the same on the surface of a light permeable refractive medium used for color cathode-ray tube screen exposure.

It is conventional practice in the manufacture of screens for color cathode-ray tubes to attach the discrete areas of colored phosphor to the tube face panel with a light sensitive material. To properly consummate the adherence of each color phosphor, the face panel, having the light sensitive material and phosphor formed as a screen thereon, is mated with a suitable negative or foraminous mask. This combination is placed on a screen exposure apparatus having an optical system comprising a corrective refractive medium and a conjunctive source of radiant energy relatively positioned to provide a sufficient amount of radiant energy for proper exposure activation of the light sensitive screen during processing.

Activation light from the source of radiant energy traverses the corrective light permeable refractive medium or lens and is directed thereby to pass through the openings in the foraminous mask and angularly impinge upon definite phosphor areas of the screen in a manner to be subsequently matched by directed electron bombardment in the finished tube. Thus, each of the separate color fields comprising the screen are individually activated by separate optical projection systems discretely positioned predeterminately offcenter from the axis of the screen. By this procedure, light emanating from each source traverses the same mask openings but impinges upon a different set of screen areas for each color field and respectively activates or hardens the light sensitive material thereunder producing adherence of discrete areas or dots of phosphor to the panel surface. In each instance, the unexposed or unhardened screen areas are removed by subsequent processing development. This procedure is repeated for each of the color fields making up the screen of the tube.

The assurance of adequate exposure is important since the masks employed usually have an array of "graded" apertures therein i.e., the diametrical size of the apertures decreases outwardly from the center of the mask so that the smaller diametered apertures are located around the edge of the mask. In addition the nature of the point source of light is such that the luminous irradiation is more intense at the center than at the edges of the screen.

Therefore, some compensating means for achieving light attenuation is necessary in substantially the center area of the lens to provide reduced irradiation therefrom while the irradiation from the peripheral portions of the lens is uninhibited thereby effecting consistent exposure throughout the screen to provide for uniform color dot formation or growth exposure throughout the screen.

The usual means for accomplishing this attenuation has been by vacuum vaporizing a thin deposit of metallic film on a specific area of the lens surface. The density of the attenuation pattern was obtained by positioning a revolving dodging mask between the source of the metal vapor and the respective lens area. Even with carefully controlled deposition it was difficult to obtain an optimum differential of light attenuation to specifically compensate the irradiation pattern emitted by the light system.

OBJECTS AND SUMMARY OF THE INVENTION

It is an object of the invention to reduce the aforementioned difficulty and to provide an optical component having improved light attenuation means thereon.

Another object is to provide an optical component having light attenuation characteristics that are matched with the light source.

A still further object of the invention is the provision of an optical component having a light attenuation pattern photographically formed on the surface thereof by using the same screen exposure apparatus wherein the compensated light attenuated component will subsequently, after processing, be reinserted and utilized to effect screen exposure.

The foregoing objects are achieved in one aspect of the invention by providing a light permeable optical component having a discrete light attenuation pattern in the form of an exposed and developed photosensitive metallic coating disposed on at least one surface thereof. The light attenuation characteristics that are photographically achieved in the color tube screen exposure apparatus by irradiation from the same radiant energy source which will be eventually attenuated by the resultant metallic coating.

For a better understanding of the present invention, together with other and further objects, advantages, and capabilities thereof, reference is made to the following disclosure and appended claims in connection with the accompanying drawings.

DESCRIPTION OF THE PREFERRED EMBODIMENT

Figure 1:
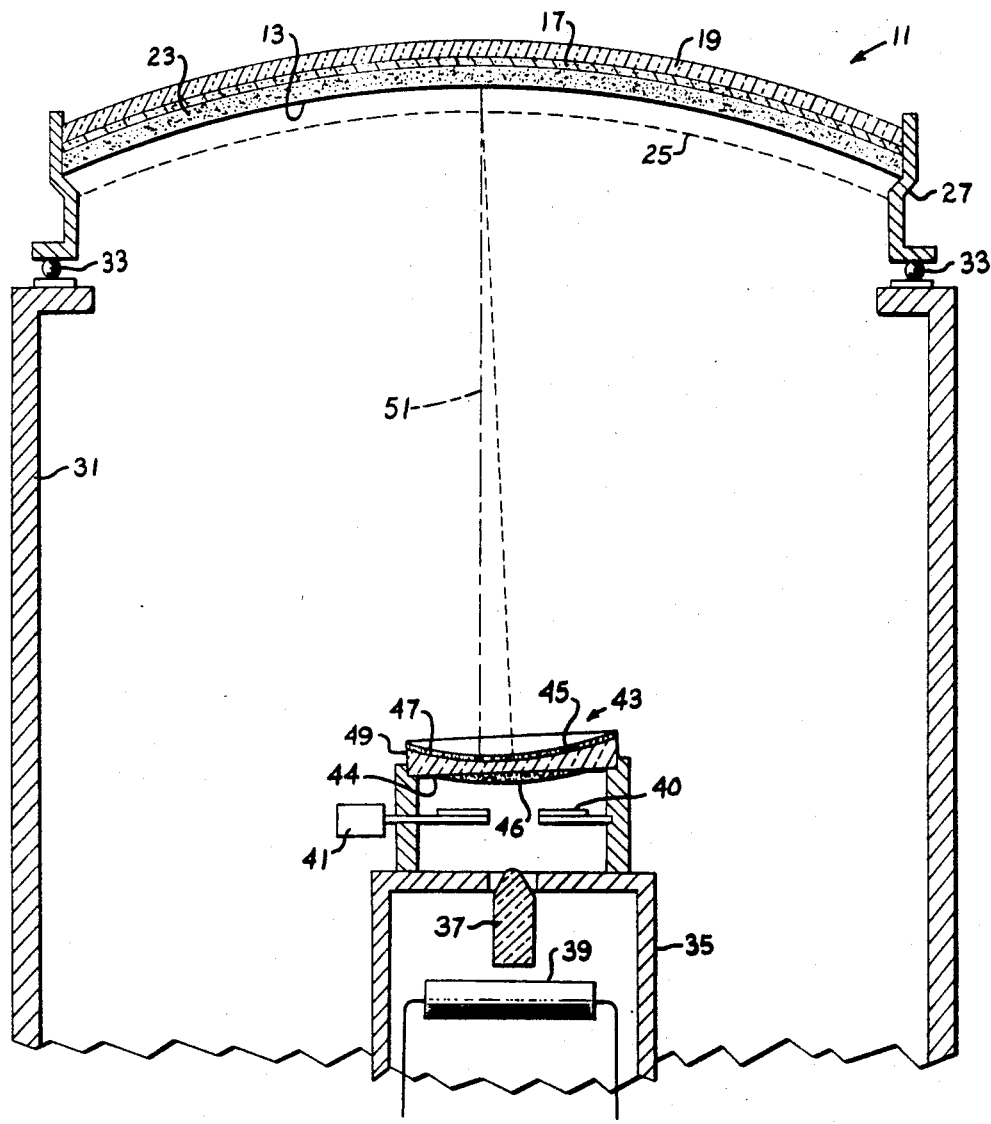
FIG. 1 is a cross-sectional view illustrating the parts of a color screen exposure apparatus and showing the refractive medium contained therein.

Referring to FIG. 1, there is shown a typical "lighthouse" or exposure apparatus 11 utilized for photographically activating a typical foraminously masked light sensitive screen 13 of a color cathode-ray tube. This apparatus is repetitively used to separately activate a plurality of specific areas for each of the color fields.

In detail, screen 13 comprises a coating of radiant energy sensitive substance 17, as for example, polyvinyl alcohol sensitized with ammonium dichromate, suitable disposed on the interior surface of the glass face panel 19 and overlaid with specific electron responsive fluorescent phosphor materials 23 as by dusting or spraying. If desired, the radiant energy sensitive substance 17 and the phosphor material 23 may be intermixed initially to form a slurry which may be subsequently deposited on panel 19. Positioned adjacent screen 13 is a foraminous mask 25 to provide discrete masking of the screen material so that only the desired areas of the screen will be exposed for any given color activation operation to provide a field of discrete dots of the specific color. The glass face panel 19, with screen 23 disposed thereon, and the conjunctive mask 25 are mounted in panel rim 27, which in turn is placed upon "lighthouse" frame 31 and aligned therewith radially and axially by means of cooperation between projections 33 formed on the bottom surface of panel rim 27 and compatible grooves contained in the top surface of frame 31. Positioned internally within the frame in an apertured enclosure 35 is a transmitting light rod 37 which collects the radiant energy emitted by the source 39 such as, for example, a mercury vapor lamp. The light rod 37 is diffusely ground and functions as a point source of radiant energy directing light toward the screen 13. Mounted above the light rod and in spaced relationship thereto is a substantially symmetrical radiant energy permeable refractive medium or lens 43 which refracts the light rays to provide for proper activation of the discrete screen areas. Intermediate the light rod and the lens there is positioned a light valve or aperture shutter 40 controlling a large stop aperture to regulate the duration of exposure. Thus, the end points of the light rays employed in the exposure operation are directed to match with the landing points of the electrons during subsequent tube operation. The point source of light 37 and the lens 43 are offset at a predetermined distance from the axis 51 of panel 19 for each of the separate color exposures comprising the screen activation.

Figure 2:
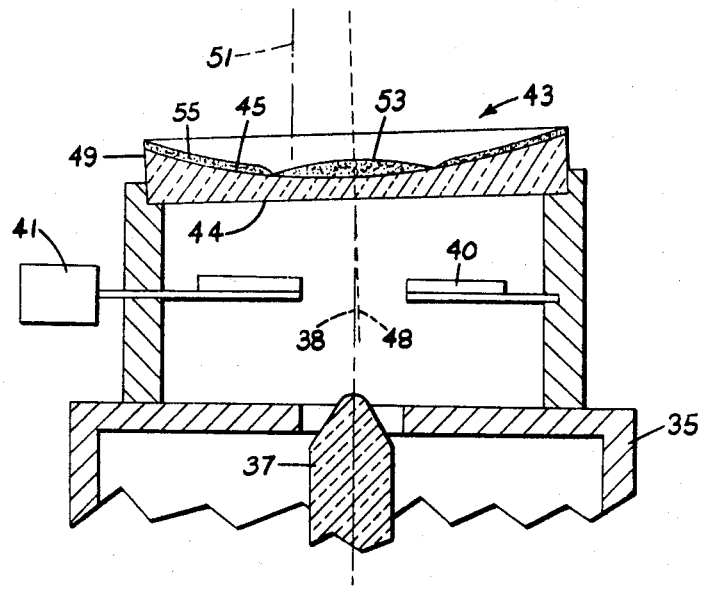
FIG. 2 is an enlarged cross-sectional view showing another embodiment of the refractive medium contained therein.

In the embodiment of the invention shown, the refractive medium 43 is a substantially symmetrical water white or spectacle crown glass lens having a planosurface 44 and an oppositely disposed concave surface 45 as detailed in FIG. 2. As oriented in the "lighthouse," the planosurface 44 is proximal to the point light source 37 with the concave surface 45 facing the screen. The planosurface 44 has discretely disposed thereon a variable density metallic coating 46 of microthickness providing light attenuation in the central lens areas subjected to greater irradiation intensity emanating axially from the terminal light source 37. The microthickness of this filtering or light attenuating coating is not of sufficient thickness to alter the refractive properties of the lens. This light attenuation coating is accurately and efficiently formed by photographic means as will be hereinafter described. If desired, the concave surface 45 of the lens 43 may contain an antireflective coating 47 such as magnesium fluoride to eliminate reflections from within the lens and specular reflections from without such as the secondary effects of reflections rebounding from the interstitial portions of the foraminous mask 25.

Figure 5:
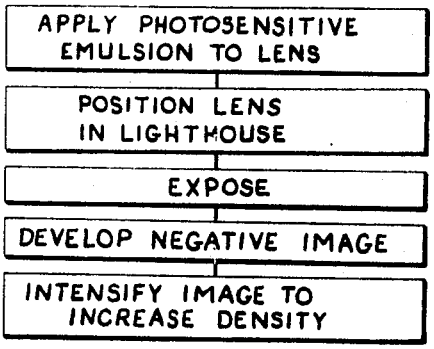
FIG. 5 is a block diagram showing steps in a method for achieving a light attenuating coating in accordance with the invention.

One method for achieving the photographically disposed light attenuation properties for the lens, as shown in FIG. 5, is to sensitize the planosurface of the lens with a flow coating of fine grain photosensitive silver halide emulsion of the type conventionally used in the preparation of extremely fine grain photographic negatives. This is custom disposed in light controlled laboratory environment. Several slow fine grain emulsions suitable for this usage are available. One such type is that used in the manufacture of Panatomic X film as made by Eastman Kodak Company, Rochester, New York. Another suitable extremely fine grain negative material is the Lippman-type emulsion also available from the above-mentioned source. After sensitizing of the planosurface, the lens is packaged, handled and stored in a manner appropriate to that conventionally used for unexposed photographic film. Exposure to form the attenuation coating, as indicated in FIG. 5, is made under darkroom conditions wherein the sensitized lens 43 is placed within the lighthouse apparatus 11 and oriented as required for ultimate usage. There is no need for a panel, screen or mask to be in position for this operation. Exposure of the emulsion is accomplished by activating the regular lamp 39 whereby light traverses the light rod 37 and by manipulating shutter 40 is allowed to flood the sensitized planosurface of the lens. As previously mentioned, there is a difference in the intensity of light striking the lens; the most intense luminous irradiation being the shortest distance from the terminal of the light rod 37 and diminishing therefrom in a differential pattern as the angle of incidence of irradiation increases. To facilitate subsequent dynamic convergence, it has been found preferable to offset the lens 43 from the axis of the light rod 37 and/or to tilt the lens relative to the light rod axis. Accordingly, by tilting the lens 43 as shown in FIGS. 1 and 2, the axis 48 of the lens and the axis 38 of the light rod 37 are not coincident. Under such circumstances it can be seen that the intensity of the light rays emanating from lens 43 will not be symmetrical about the lens axis. In any event the density of the light attenuation coating should decrease outwardly from the point of optimum irradiation where the shortest incident light ray strikes the lens surface. Thus, a latent image of the irradiation pattern of the point light source 37 is recorded in the emulsion in the area substantially adjacent the light source. The time duration of exposure is critical only to the extent that a localized irradiation pattern of the available light in the intense area is recorded. Underexposure is preferred to overexposure since excessive exposure tends to both burnout or destroy minute differential exposure gradations that are subsequently utilized for desired attenuation and activate a larger emulsion area than desired. Experimentation determines the optimum exposure time for realizing the best results from a particular emulsion to record therein the centrally intense luminous irradiation. It has been found that exposure of a fractional part of a second duration is adequate for Panatomic X type emulsion. This is accomplished by opening and closing aperture shutter 40 for microsecond duration by means of an integrally linked timing attachment 41.

After exposure the lens is removed from the "lighthouse" under darkroom precautions and subjected to photographic processing, as indicated in FIG. 5, to convert the invisible latent imagery of the irradiation pattern to a visual negative manifestation. Conventional photographic developing techniques and materials are utilized. Either tray or tank developing procedure may be successfully employed in a safelight environment with the related factors of temperature, time and solution concentrations being in accordance with the respective manufacturer's recommendations. As previously mentioned, experimentation is necessary to formulate an optimized procedure which is conjunctive with the exposure made. It has been found that satisfactory results are produced by using a chemical reducing agent in the form of a fine grain developer such as Kodak KD20 Developer on Panatomic X emulsion. Another suitable fine grain developer is Kodak Microdel X. Both of these development chemicals are available from Eastman Kodak Company, Rochester, New York. Successful development is accomplished in fifteen minutes by using the tray method in total darkness with periodic subdued safelight checks of seconds duration; the solution temperature being maintained at 68° Fahrenheit. This processing step continues the chemical change initiated by the action of light during exposure of the emulsion wherein the light effected silver halide grains are reduced to silver thereby producing a visible negative image.

When the image is deemed satisfactory in comparison to a standard, the lens is transferred to a stop bath rinse comprising a mild solution of acetic acid 28 percent and water for a period of 10 to 20 seconds to arrest the action of the developer. A commercially prepared stop bath such as Kodak SB-1a may be utilized if desired. This stop material is manufactured by Eastman Kodak Company, Rochester, New York.

The lens is then placed in a weak acid clearing bath or fixer for approximately 2 minutes. This may be a conventional hypo (sodium thiosulfate) solution wherein the silver particles formed the image are stabilized and the remaining unactivated or undeveloped silver halide is dissolved out. Water rinsing completes the initial process.

There is now remaining on the planosurface of the lens, as shown in FIG. 1, a discrete area of stabilized silver providing a customized variable density filter in the form of a negative pattern of the localized intense area of luminous irradiation emanating from the light rod 37. The definitive negative tones range from peripheral transparency to a substantially central gray-black area. Peripheral to the discrete coating 46 there is the surrounding area of planolens surface 44 which has been made bare by the photo processing procedure wherein the unactivated silver halide has been removed. To further compensate for the larger sized apertures in the central portion of the foraminous mask 25, increased light attenuation for this central portion is beneficial. This can be achieved in several ways, for example, the lens may be immersed in the aforementioned developing bath for a longer period of time to accomplish control over development which will darken the image and provide greater light attenuation for the desired portion of the lens. The other processing steps remain unchanged. Another means for obtaining increased light attenuation, as shown in FIG. 5, involves the use of a silver intensifier solution, such as Kodak In-5, which is available from the aforementioned Eastman Kodak Company. This solution is used as an added processing step following the hypo bath and darkens the negative image. The resulting degree of intensification depends upon the time duration of treatment after which the lens is immersed for several minutes in a 30 percent solution of hypo followed by a water rinse.

As mentioned before, the amount of light attenuation afforded by the lens is very important in achieving uniform color dot growth throughout the screen. The glass make up of the lens, such as water white, will have a nominal light transmittance of approximately 90 percent. The thickness of the glass due to lens configuration, the different angles of incidence encountered, the diametrical variation of mask apertures and the irradiation pattern of the point source of light are related factors for which compensation is afforded by the discrete area of variable density lens coating. The heaviest light attenuation effected by this area is nominally 75 percent thereby allowing a nominal transmittance of 25 percent which passes an amount of luminous irradiation that is slightly above the activation threshold of the light sensitive material comprising a color tube screen. Attenuation decreases radially from the point of heaviest attenuation to the bare portion of the lens which affords the natural attenuation of the glass varied by length of path therethrough and angle of incidence involved. Compensation is thereby achieved by holding back the light in the areas of intense illumination and the larger size mask apertures.

As previously mentioned, a microthin antireflective coating 47 of a material such as magnesium fluoride (MgF$_2$) may be applied to the concave surface 45 of the lens 43 to eliminate internal and external specular reflections. Conventional deposition means such as vaporization in a vacuum may be utilized in this coating process. During this operation, the attenuated planosurface 44 is temporarily protected by a suitable shield of metal or glass positioned to shadow the light attenuated area 46 and the peripheral edge 49 to prevent deposition of antireflective coating 47 thereupon. After application of the magnesium fluoride coating the lens is ready for usage in a screen exposure lighthouse, being positioned within lighthouse frame 31 as shown in FIG. 1.

In usage, as aforementioned, illumination emanating from the light source which was previously used to activate the photographic attenuation emulsion is now attenuated by the processed lens to provide the degree of illumination necessary for uniform screen dot growth over the whole of the light sensitive color tube screen.

An alternate embodiment of the invention as shown in FIG. 2 disposes the variable density attenuation coating 53 on the concave surface 45 of the lens 43. A flow coating of fine grain photosensitive silver halide emulsion is custom applied to concave surface 45 in a manner similar to that used for the deposition of the emulsion on planosurface 44 in the previously described embodiment. The emulsion coated lens is then oriented within the lighthouse apparatus 11 and exposed by shuttered light from light rod 37. A latent image of the differential pattern of luminous irradiation is thus formed in the emulsion which is subsequently photographically developed to a visible negative image in the form of a discrete area of light attenuating coating 53 which may be intensified as previously described.

Figure 3:
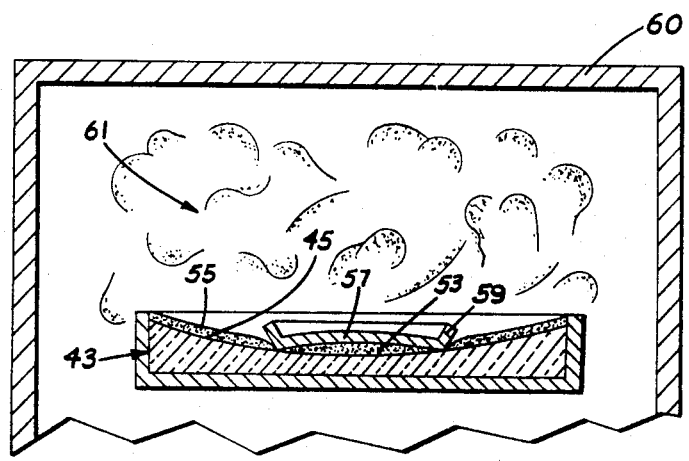
FIG. 3 illustrates means for protecting the light attenuating coating during the deposition of an adjacently disposed coating.

It is desirable to have an antireflection coating 55 of magnesium fluoride disposed on the concave surface 45 in the area surrounding light attenuation coating 53. This is achieved by conventional vapor deposition in a vacuum enclosure 60 wherein the discrete deposition of the antireflection coating 55 is accomplished by covering the area of light attenuating coating 53 with a substantially circular shield 57 suitably formed to specifically fit the contour of the concave surface 45 of lens 43 as shown in FIG. 3. The periphery of the shield 57 being formed to provide an obtusely angled upstanding edge 59 to effect a feathered transition between the antireflection coating 55 and the light attenuation coating 53 as the magnesium fluoride molecules 61 are disposed from the vapor cloud thereof. Upon completion of the vapor deposition, the shield 57 is removed, and there is thus provided on the concave surface 45 two specific coatings 53 and 55 in the distinct areas as desired. The lens is now ready for placement within lighthouse structure 31 as part of the desired optical system for color tube screen exposure.

Figure 4:
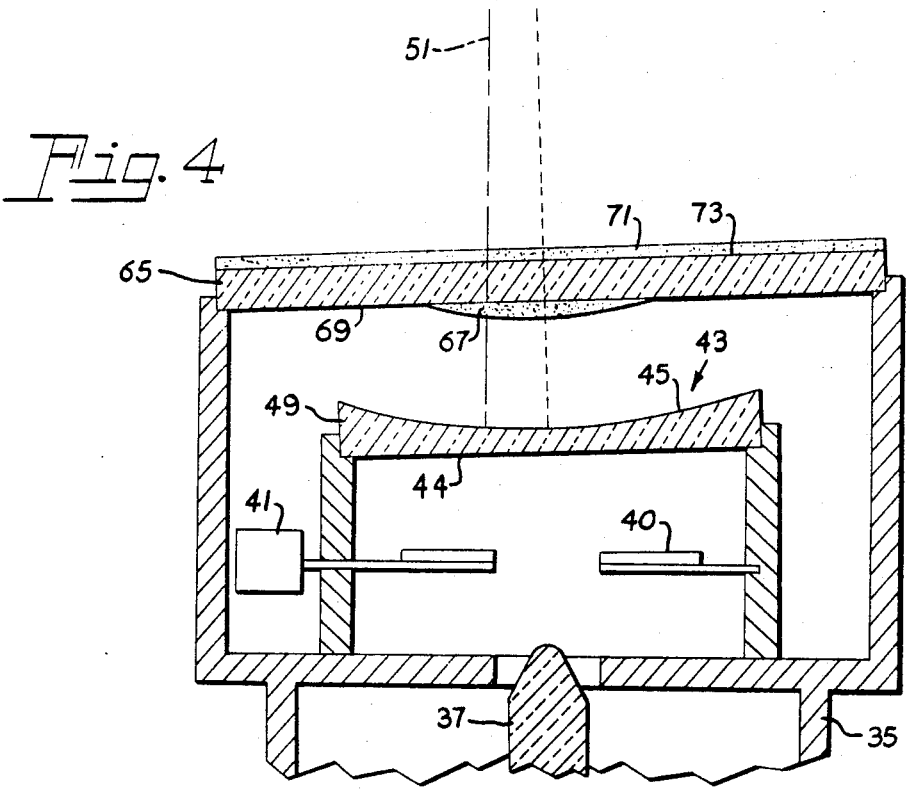
FIG. 4 is a cross-sectional view showing an alternate embodiment of the invention.

Still another embodiment is shown in FIG. 4 wherein a light permeable planar medium in the form of a thin plate of optical glass 65 compatible with the glass of the lens 43 is spacedly positioned intermediate the lens and the screen. Necessary compensation for the conjunctive refractive properties of the plate and lens are adequately achieved by lens contour. In this embodiment of the invention neither surface of the lens 43 requires any coating. The light attenuation coating 67 is photographically disposed in the aforementioned manner on the planar surface 69 adjacent the lens 43. An antireflective coating 71 such as magnesium fluoride is applied to the planar surface 73 proximal to the screen. In this embodiment, while not shown, efficiency of the optical system may be increased by also coating both surfaces 44 and 45 of lens 43 with antireflective coating. Thus, the light attenuation pattern may be suitably contained on a medium other than the lens proper. If desired, the light attenuation coating can be disposed on the planar surface of the plate proximal to the screen as was done in the lens embodiment illustrated in FIG. 2.

The position of the glass plate 65, while shown in FIG. 4 to be relatively adjacent the lens 43, can be oriented elsewhere intermediate the lens and the screen. There is an advantage in positioning it in the proximity of the lens in that a smaller and thinner piece of glass can be utilized thereby reducing the required refractive compensation.

While not shown, an additional embodiment places the plate of glass with light attenuating coating thereon between the lens 43 and the aperture shutter 40, the coating being photographically disposed in the manner previously described. In this embodiment both surfaces 44 and 45 of lens 43 would require antireflection coatings thereon as mentioned in the previous embodiment.

It is clearly evident that screen exposure, through discrete light attenuated optical components of the types herein described, is exceptionally uniform as the attenuation pattern is directly oriented and compensatingly matched with the luminous irradiation pattern of the light source. The photographic formation of the light attenuation pattern on the lens or plates, by utilizing the exposure apparatus wherein the lens or plates are subsequently used, produces a compensated optical system having a much greater uniformity of light output than heretofore achieved.

While there has been shown and described what are at present considered the preferred embodiments of the invention, it will be obvious to those skilled in the art that various changes and modifications may be made therein without departing from the invention as defined by the appended claims.

We claim:

1. A customized light permeable variable density filter component for use in an optical system to discretely attenuate radiant energy beamed from a particular controlled light source to a light receiving screen, said component comprising:
a light permeable refractive medium having oppositely disposed first and second optically related surfaces; and
a discrete substantially centrally oriented area of light attenuation coating disposed on said first of said surfaces of said refractive medium in substantially the central area thereof, said light attenuation coating being in the form of a negative image of the irradiation characteristics of said particular light source with tonal properties ranging from peripheral transparency to a substantially gray-black central area to compensate for the specific differential irradiation pattern of said light source, said peripheral area of said first surface having a discretely disposed antireflective coating uniformly disposed thereon in a manner to provide a transition region between said attenuation and said antireflective coatings.

2. A light permeable variable density filter component according to claim 1 wherein said gray-black central coating area does not exceed substantially 75 percent light attenuation to pass a nominal transmittance of luminous irradiation that is above the activation threshold of the light sensitive material comprising said screen.